3,137,688
AZO-DYESTUFFS

Karl Ronco, Muttenz, Switzerland, assignor to Ciba Limited, Basel, Switzerland, a company of Switzerland
No Drawing. Filed Dec. 22, 1961, Ser. No. 161,365
Claims priority, application Switzerland Dec. 30, 1960
6 Claims. (Cl. 260—174)

The present invention provides valuable azo-dyestuffs which are free from groups imparting solubility in water and correspond to the general formula (1)
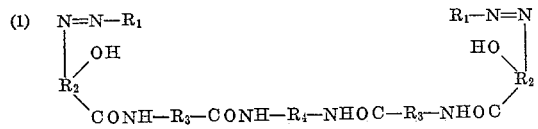

in which $R_1$ represents a benzene radical, $R_2$ represents a naphthalene radical in which the azo, hydroxyl and carboxylic acid amide groups are in the 1-, 2- and 3-positions, respectively, $R_3$ represents a benzene radical in which the CO-group is in meta-position relatively to the —NH—group, and $R_4$ represents an aryl radical.

The invention also provides a process for the manufacture of the new dyestuffs, wherein 2 molecular proportions of a carboxylic acid halide, which is free from groups imparting solubility in water, more especially sulfonic acid, carboxylic acid and sulfonamide groups, and corresponds to the formula

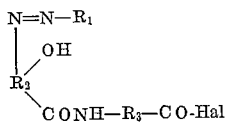

more especially such a carboxylic acid halide of the formula

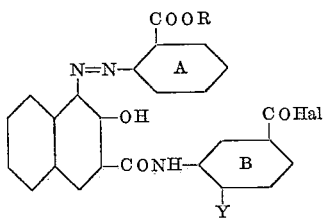

in which Y represents an alkyl or alkoxy group or a halogen atom, R represents an alkyl group, and the benzene radicals A and B may contain further substituents not imparting solubility in water, are condensed with one molecular proportion of an aromatic diamine.

The azo-carboxylic acids, from which the acid halides of the formula (2) are prepared, are obtained by coupling a diazotized aminobenzene with a 2:3-hydroxynaphthoic acid, converting the resulting azo-carboxylic acid into its acid chloride, and condensing the latter with an aminobenzene carboxylic acid. As diazo-component there is advantageously used an aminobenzene containing in ortho-position to the amino group a substituent that does not impart solubility in water, for example, a halogen atom or an alkyl, alkoxy, trifluoromethyl, nitro or cyano group or more especially a carbalkoxy group. As examples may be mentioned:

meta-chloraniline,
2:5-dichloraniline,
para-bromaniline
ortho-, meta- or para-nitraniline,
meta-xylidine,
3-trifluoromethylaniline,
ortho- or para-methoxyaniline,
3-cyan-aniline,
2-chloro-5-methylaniline,
4-chloro-2-methylaniline,
2-methyl-5-chloraniline,
2-chloro-4-nitraniline,
2-chloro-5-trifluoromethylaniline,
2-nitro-4-chloraniline,
4-chloro-2-methoxyaniline,
2-chloro-4-methoxyaniline,
4-chloro-2-methoxy-5-methylaniline,
2-nitro-4-methylaniline,
4- or 5-nitro-2-methylaniline,
4-nitro-2-methoxyaniline,
4-chloro-2:5-dimethoxyaniline, and advantageously aniline carboxylic acid esters, such as
aniline-2-, -3- or -4-carboxylic acid methyl ester,
aniline-3:5-dicarboxylic acid dimethyl ester,
4- or 5-chloro-2-aminobenzoic acid methyl ester or
4-nitro-5-aminobenzoic acid methyl ester.

The 2:3-hydroxynaphthoic acid used as coupling component may be substituted in the benzene ring not containing the carboxyl group, for example, by a halogen atom, more especially a bromine atom in the 6-position, or an alkoxy or alkyl group. It is, however, of advantage to use the 2:3-hydroxynaphthoic acid itself owing to its availability.

The resulting azo-dyestuff carboxylic acids are converted into their halides, and then condensed with a meta-aminobenzene carboxylic acid, preferably with one that contains a substituent, for example, a halogen atom or an alkoxy group, in para-position to the carboxyl group. As examples there may be mentioned:

4-methoxy-3-aminobenzoic acid,
4-chloro-3-aminobenzoic acid,
5-amino-2:4-dichlorobenzoic acid,
5-amino-4-methoxy-2-chlorobenzoic acid and
4-methylmercapto-3-aminobenzoic acid.

The resulting azo-dyestuff carboxylic acids are treated with agents capable of converting carboxylic acids into their halides, for example, their chlorides or bromides, more especially a phosphorus halide, such as phosphorus pentabromide or phosphorus trichloride or pentachloride, a phosphorus oxahalide or preferably thionyl chloride.

The treatment with such an acid-halogenating agent is advantageously carried out in an inert organic solvent, such as dimethyl-formamide, a chlorobenzene, for example, monochlorobenzene or dichlorobenzene, or toluene, xylene, or nitrobenzene, the five last-mentioned solvents being used, if desired, together with dimethyl-formamide.

In preparing the carboxylic acid halides it is generally of advantage first to dry the azo-compounds, that have been prepared in an aqueous medium, or to free them from water azeotropically by boiling them in an organic solvent. If desired, the azeotropic drying may be carried out immediately prior to the treatment with the acid-halogenating agent.

In the process of the invention the resulting monocarboxylic acid halides are condensed with aromatic diamines, preferably those of the benzene or diphenyl series, in the molecular ratio 2:1. As diamines of the benzene series there may be mentioned more especially those of the formula

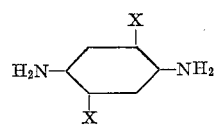

in which X represents a hydrogen or halogen atom or a lower alkyl or alkoxy group.

As examples the following amines may be mentioned:

1:4-diaminobenzene,
1:3-diaminobenzene,
1:3-diamino-4-methylbenzene,

1:3-diamino-4-methoxybenzene,
1:3-diamino-4:6-dichlorobenzene,
1:3-diamino-4-chlorobenzene,
1:3-diamino-2:5-dichlorobenzene,
1:4-diamino-2-chlorobenzene,
1:4-diamino-2-bromobenzene,
1:4-diamino-2:5-dichlorobenzene,
1:4-diamino-2-methylbenzene,
1:4-diamino-2:5-dimethylbenzene,
1:4-diamino-2-chloro-5-methylbenzene,
1:4-diamino-2-methoxybenzene,
1:4-diamino-2:5-dimethoxybenzene,
1:4-diamino-2:5-diethoxybenzene,
1:3-diamino-4:6-dimethylbenzene,
1:3-diamino-2:6-dimethylbenzene,
4:4'-diaminodiphenyl,
3:3'-dichloro-4:4'-diaminodiphenyl,
3:3'-dimethyl-4:4'-diaminodiphenyl,
3:3'-dimethoxy-4:4'-diaminodiphenyl,
3:3':5:5'-terachloro-4:4'-diaminodiphenyl,
3:3'-dichloro-5:5'-dimethyl-4:4'-diaminodiphenyl,
4:4'-diaminodiphenyl-methane,
4:4'-dimethoxy-3:3'-diaminodiphenyl-methane,
4:4'-diaminodiphenylamine,
4:4'-diaminodiphenyl oxide,
4:4'-diaminodiphenyl ketone,
2:8-diaminocrysene,
4:11-diaminofluoroanthene,
2:6- or 1:5-diaminonaphthalene, and diaminobenzthiazoles, such as 2-(4'-aminophenyl)-6-aminobenzthiazole.

The condensation of the carboxylic acid halides defined above with the amines is advantageously carried out in an anhydrous medium. Under these conditions the condensation generally proceeds surprisingly easily even at temperatures within the boiling range of conventional organic solvents, such as toluene, monochlorobenzene, dichlorobenzene, trichlorobenzene, nitrobenzene or the like. To accelerate the reaction it is in general advantageous to work in the presence of an acid-binding agent, such as anhydrous sodium acetate or pyridine. Some of the dyestuffs so obtained are crystalline and others are amorphous and in most cases they are obtained in very good yields and in a pure state. Before the condensation it is of advantage to isolate the acid chloride obtained from the carboxylic acid, but in some cases the isolation of the acid chloride can be omitted without harm, the condensation then being carried out immediately following the preparation of the carboxylic acid chloride.

The dyestuffs of the invention are also obtainable by a modification of the process, wherein 2 molecular proportions of a carboxylic acid halide which is free from groups imparting solubility in water and corresponds to the formula (4)

are condensed with one molecular proportion of a diamine of the formula (5) $H_2N-R_3-CONH-R_4-NHCOR_3-NH_2$ in these formulae $R_1$, $R_3$ and $R_4$ have the meanings given above.

The dyestuffs of the invention, more especially those of the formula (6)
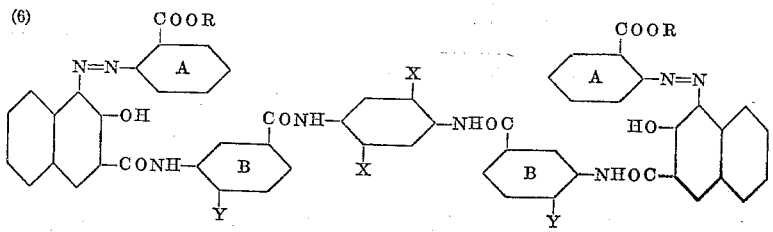

in which A, B, R, X and Y have the meanings given above, and in particular R represents lower alkyl are valuable pigments which, owing to their insolubility in organic solvents and their resistance to heat are excellently suited for coloring plastic masses pure orange tints. They are distinguished by their excellent fastness to light and migration. Special noteworthy is the good tinctorial strength of these dyestuffs, notwithstanding the presence of the two aminobenzene carboxylic acid radicals as middle members that do not contribute in the production of color. Apart from their use in coloring plastic masses, the dyestuffs of the invention are also suitable for so-called pigment printing, that is to say, printing methods in which a suitable adhesive, such as casein, a hardenable synthetic resin, more especially urea-formaldehyde or melamine-formaldehyde condensation products, solutions or emulsions of polyvinyl chloride or polyvinyl acetate or other emulsions, for example, as oil-in-water or water-in-oil emulsions, is used to a fix a pigment on a substratum, more especially on textile fibers, or on other flat structures, such as paper (for example, wallpaper) or fabrics of glass fibers.

The pigments of the invention can also be used, for example, in a finely divided form, for spin-dyeing, viscose or cellulose ethers or esters, or polyamides or polyurethanes, and they are also well suited for the production of colored lacquers or lacquer formers, solutions and products of acetyl-cellulose, nitro-cellulose, natural resins or synthetic resins, such as polymerization or condensation resins, for example, aminoplasts, phenoplasts, polystyrene, polyethylene, polypropylene, polyacrylates, gums, casein, silicones and silicone resins. Furthermore, they can be used with advantage for the manufacture of color pencils, cosmetic preparations or laminated sheet material.

Preparations, that contain such pigments in a finely divided form, can be obtained in known manner by an intense mechanical treatment, for example, on roller mills or in suitable kneaders. For this purpose the dispersing medium in which the intense mechanical treatment is carried out, is selected with regard to the nature of the preparation to be made, for example, for making a preparation dispersible in water sulfite cellulose waste liquor or dinaphthylmethane disulfonates may be used, and for the manufacture of cellulose acetate rayon spinning solutions a mixture of acetyl-cellulose with a small amount of solvent may be used.

By virtue of the particularly advantageous physical form in which the pigments of the invention are generally obtained, any by virtue of their chemical inertness and good heat resistance, it is easy to disperse them in masses or preparations of the aforesaid kind, and this operation is advantageously carried out before the masses or preparations have reached their final form. The operations required for the shaping, such as spinning, pressing, hardening, casting, cementing or the like, can then easily be carried out in the presence of the pigment without interfering with any chemical reactions of the substratum, such as further polymerization, condensation or the like.

The following examples illustrates the invention, parts and percentages being by weight.

*Example 1*

38.5 parts of the dyestuff obtained by coupling diazotized 5-chloro-2-aminobenzoic acid methyl ester with 2:3-hydroxynaphthoic acid are finely dispersed in a mixture of 500 parts of ortho-dichlorobenzene, 13 parts of thionyl chloride and 2 parts of dimethyl-formamide and the whole is heated, while stirring, for 1 hour at 115–120° C., and then allowed to cool. The resulting crystalline mono-carboxylic acid chloride is filtered off, rinsed with benzene and dried in vacuo at 50 to 60° C. 12.1 parts of this chloride are stirred into 150 parts of ortho-dichloro-benzene at 100° C. A hot solution of 5 parts of 3-amino-4-methoxy-benzoic acid in 150 parts of ortho-dichloro-benzene is added, and the mixture is stirred for 15 hours at 140 to 145° C. The condensation product so formed 4.5 parts of this chloride are stirred at 100° C. into 300 parts of ortho-dichlorobenzene, and a hot solution of 0.43 part of para-phenylene diamine in 40 parts of ortho-dichlorobenzene is poured in. The mixture is stirred for 16 hours at 140 to 150° C. The pigment formed is filtered off at 120° C. and washed successively with hot ortho-dichlorobenzene, hot benzene and methanol, and then dried in vacuo at 50 to 60° C. The pigment dyestuff is an orange-red powder which is very sparingly soluble in organic solvent. When brought into a state of fine subdivision it colors polyvinyl chloride foils brilliant orange tints of very good fastness to migration and light.

The product so obtained corresponds to the formula

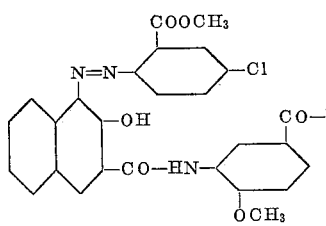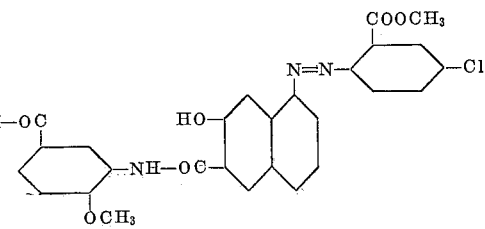

is then filtered off at 100° C., washed with hot ortho-dichlorobenzene and then with hot benzene, and dried in vacuo at 60 to 70° C.

8 parts of the above condensation product are finely dispersed in a mixture of 150 parts of ortho-dichloro-benzene, 2.5 parts of thionyl chloride and 0.5 part of di-methyl-formamide, and the whole is stirred for 3 hours at 115–120° C., then diluted with 50 parts of ortho-di-chlorobenzene and filtered at 140° C. The filtrate is allowed to cool and the mono-carboxylic acid chloride, which settles out in the form of fine fibers, is filtered off with suction, is rinsed with benzene and dried in vacuo at 50 to 60° C.

for the following table are given further products having similar properties, which are obtained as described above. Column I gives the diazo-bases $R_1NH_2$, Column II the coupling components

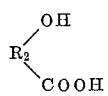

Column III, the amino-carboxylic acids $$H_2N-R_3-COOH$$

Column IV the diamines $NH_2-R_4-NH_2$, and Column V gives the coloration of polyvinyl chloride foils colored with the azo-pigment.

| | I | II | III | IV | V |
|---|---|---|---|---|---|
| 1 | 2-Aminobenzoic acid methyl ester. | 2:3-Oxynaphthoic acid | 5-Amino-4-methoxy 2-chlorobenzoic acid. | 2:5-Dichloro-p-phenylene diamine. | Yellow-orange. |
| 2 | ___do___ | ___do___ | ___do___ | p-Phenylene diamine | Do. |
| 3 | 5-Chloro-2-aminobenzoic acid methyl ester. | ___do___ | 4-Methoxy-3-amino-benzoic acid. | 2-Chloro-p-phenylene diamine. | Orange. |
| 4 | ___do___ | ___do___ | 5-Amino-4-methoxy 2-chlorobenzoic acid. | 2:5-Dichloro-p-phenylene diamine. | Do. |
| 5 | ___do___ | ___do___ | ___do___ | 2-Chloro-p-phenylene diamine. | Do. |
| 6 | ___do___ | ___do___ | ___do___ | p-Phenylene diamine | Do. |
| 7 | ___do___ | ___do___ | ___do___ | 4:4'-Diaminodiphenyl | Do. |
| 8 | 4-Chloro-2-aminobenzoic acid methyl ester. | ___do___ | 4-Methoxy-3-amino acid. | 2-Chloro-p-phenylene diamine. | Yellow-orange. |
| 9 | ___do___ | ___do___ | ___do___ | p-Phenylene diamine | Orange. |
| 10 | ___do___ | ___do___ | ___do___ | 4:4'-Diaminodiphenyl | Do. |
| 11 | 4-Nitro-5-aminobenzoic acid methyl ester. | ___do___ | ___do___ | 2:5-Dichloro-p-phenylene diamine. | Yellow-orange. |
| 12 | ___do___ | ___do___ | ___do___ | 2-Chloro-p-phenylene diamine. | Do. |
| 13 | ___do___ | ___do___ | ___do___ | 4:4'-Diaminodiphenyl | Orange. |
| 14 | 2:5-Dichloraniline | ___do___ | ___do___ | 2-Chloro-p-phenylene diamine. | Do. |
| 15 | ___do___ | ___do___ | ___do___ | p-Phenylene diamine | Do. |
| 16 | ___do___ | ___do___ | 5-Amino-4-methoxy-2-chlorobenzoic acid. | 2:5-Dichloro-p-phenylene diamine. | Do. |
| 17 | ___do___ | ___do___ | ___do___ | 2-Chloro-p-phenylene diamine. | Do. |
| 18 | ___do___ | ___do___ | ___do___ | p-Phenylene diamine | Red-orange. |
| 19 | ___do___ | ___do___ | ___do___ | 4:4'-Diamino diphenyl | Orange. |
| 20 | ___do___ | ___do___ | 4-Methylmercapto-3-aminobenzoic acid. | p-Phenylene diamine | Do. |
| 21 | 2-Aminoterephthalic acid dimethyl ester. | ___do___ | 4-Methoxy-3-aminobenzoic acid. | ___do___ | Yellow-orange. |
| 22 | 5-Chloro-2-aminobenzoic acid methyl ester. | ___do___ | 4-Ethoxy-3-aminobenzoic acid. | ___do___ | Do. |
| 23 | 2:4:5-Trichloraniline | ___do___ | 4-Methoxy-3-aminobenzoic acid. | ___do___ | Red-orange. |
| 24 | Anthranilic acid methyl ester. | ___do___ | 4-Methyl-3-aminobenzoic acid. | ___do___ | Orange. |
| 25 | 5-Chloro-2-aminobenzoic acid methyl ester. | ___do___ | 4-Methoxy-3-aminobenzoic acid. | 2-Chloro-5-methyl-p-phenylene diamine. | Do. |
| 26 | ___do___ | ___do___ | ___do___ | 2:5-Dimethyl-p-phenylene diamine. | Do. |
| 27 | Anthranilic acid methyl ester. | ___do___ | ___do___ | 2-Chloro-p-phenylene diamine. | Yellow-orange. |
| 28 | ___do___ | ___do___ | ___do___ | p-Phenylene diamine | Orange. |

Example 2

17.5 parts of the monoazo-dyestuffs, obtained by coupling diazotized 2-aminobenzoic acid methyl ester with 2:3-hydroxynaphthoic acid, are finely dispersed in a mixture of 160 parts of chlorobenzene, 6.5 parts of thionyl chloride and 0.5 part of dimethyl-formamide, and the whole is heated in a bath for 1 hour at 115–120° C., and then allowed to cool. The monocarboxylic acid chloride, which separates out in the form of a unitary crystalline product, is filtered off, washed with benzene, and dried in vacuo at 40 to 50° C.

A suspension of 3.75 parts of this chloride in 200 parts of ortho-dichlorobenzene is mixed with 2.03 parts of 1:4 - di - (4':4'' - dimethoxy - 3':3'' - diamino) - benzoylaminobenzene in 12 parts of dimethyl-formamide. The mixture is stirred for 16 hours at 140 to 145° C. The pigment so formed is then filtered off at 100° C., and washed successively with hot ortho-dichlorobenzene, benzene and methanol. The pigment dyestuff is an orange-red powder which is very sparingly soluble in organic solvents. In a state of fine subdivision it colors polyvinyl chloride foils yellowish orange tints of good fastness to migration and light.

The pigment so obtained corresponds to the formula

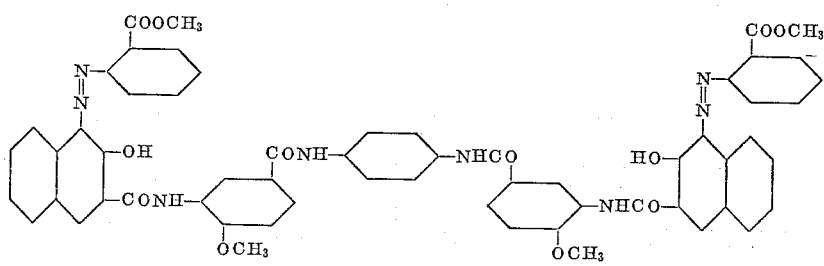

Example 3

65 parts of stabilized polyvinyl chloride, 35 parts of dioctyl phthalate and 0.2 part of the dyestuff (prepared as described in the second paragraph of Example 1) are stirred together, and then rolled to and fro on a two-roller calender for 7 minutes at 140° C. The resulting orange foil is of very good fastness to light and migration.

What is claimed is:

1. An azo dyestuff of the formula

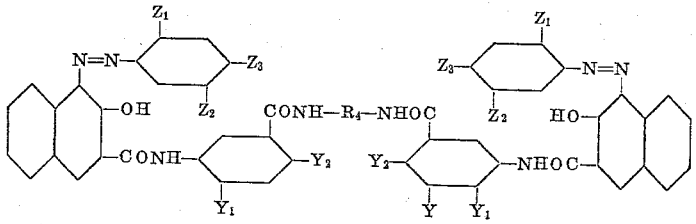

in which $Y_1$ is a member selected from the group consisting of methyl and methoxy, $Y_2$ is a member selected from the group consisting of hydrogen and chlorine, $Z_1$ is a member selected from the group consisting of chlorine and COOR in which R is lower alkyl, $Z_2$ is a member selected from the group consisting of hydrogen, chlorine and COOR, $Z_3$ is a member selected from the group consisting of hydrogen and chlorine, $R_4$ is a member selected from the group consisting of the radicals of the formulae

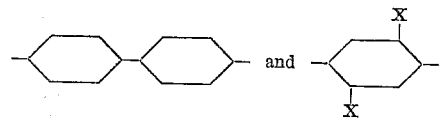

in which each X is a member selected from the group consisting of hydrogen, chlorine and methyl.

2. The dyestuff of the formula

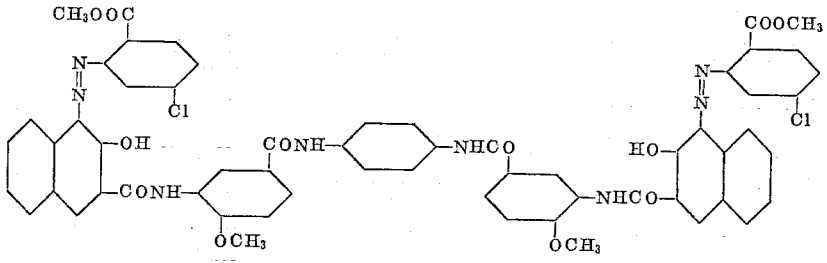

3. The dyestuff of the formula

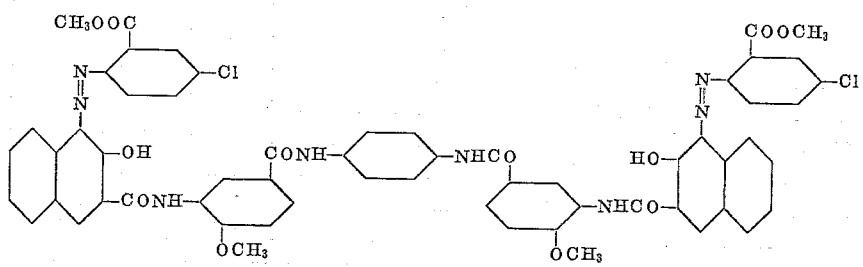

4. The dyestuff of the formula
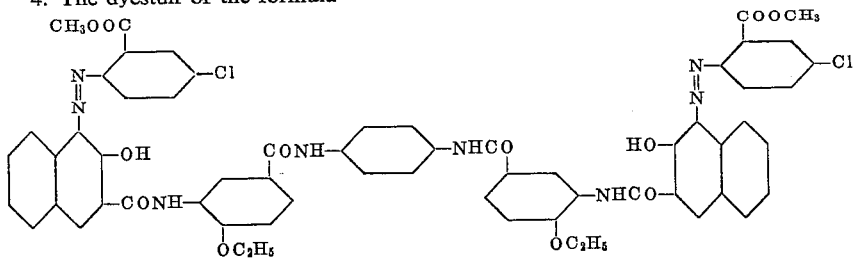
5. The dyestuff of the formula
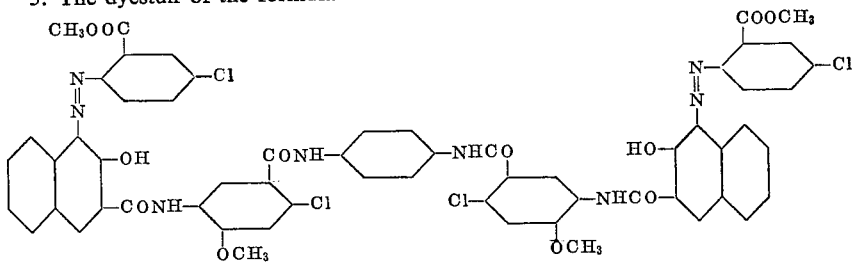
6. The dyestuff of the formula
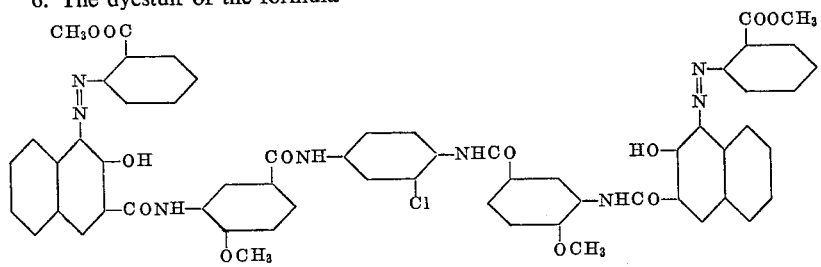
References Cited in the file of this patent
UNITED STATES PATENTS
2,774,755   Schmid et al. _____ Dec. 18, 1956